US006838603B2

(12) United States Patent
Wedgwood et al.

(10) Patent No.: US 6,838,603 B2
(45) Date of Patent: Jan. 4, 2005

(54) VALVE

(76) Inventors: Denis Wedgwood, Llys Pres, 37 Broadway, Cardiff, CF24 10E (GB); Brian Gardner, Gardner Precision Engineering, 42 Woodham Lane, new haw, Weybridge, Surrey, KT15 3NA (GB)

( * ) Notice: Subject to any disclaimer, the term of this patent is extended or adjusted under 35 U.S.C. 154(b) by 0 days.

(21) Appl. No.: 10/384,031

(22) Filed: Mar. 7, 2003

(65) Prior Publication Data

US 2003/0167897 A1 Sep. 11, 2003

(30) Foreign Application Priority Data

Mar. 8, 2002 (GB) .............................................. 0205486

(51) Int. Cl.[7] .................................................. G01D 7/10
(52) U.S. Cl. ....................................... 84/388; 84/387 R
(58) Field of Search ............................... 84/387 R, 388, 84/389, 390, 391, 392, 393

(56) References Cited

U.S. PATENT DOCUMENTS

| | | | | |
|---|---|---|---|---|
| 3,625,104 A | | 12/1971 | Amado | 84/397 |
| 4,273,310 A | | 6/1981 | Ginzler | 251/211 |
| 4,558,587 A | | 12/1985 | Fruzzetti | 73/40.7 |
| 4,905,564 A | * | 3/1990 | Thayer | 84/390 |
| 5,037,062 A | | 8/1991 | Neuhaus | 251/76 |
| 6,297,436 B1 | * | 10/2001 | Adams | 84/388 |

* cited by examiner

*Primary Examiner*—Kimberly Lockett
(74) *Attorney, Agent, or Firm*—Edwin D. Schindler

(57) ABSTRACT

A valve particularly intended to act as a water key for a musical wind instrument comprises a ball 17 captively mounted inside a housing 15 and a spring 18 which biases the ball 17 into an inlet aperture 12 of the valve. An annular actuator 20 extends around the housing 15 and comprises a plurality of projections 21 which extend radially inwardly through the housing 15, the inner ends of the projections 21 surrounding the ball 17.

In use, when the actuator 20 is pushed in any radial direction, the projections 21 dislodge the ball 17 from the inlet aperture 12 to open the valve and to allow fluid to pass into the valve through the inlet aperture 12 and out an aperture 16 in the valve, When the actuator 20 is released, the ball 17 returns to its normal position under the spring bias to close the aperture 12. The valve is simple in construction and provides a reliable seal when closed, which is not prone to wear.

14 Claims, 1 Drawing Sheet

VALVE

BACKGROUND OF THE INVENTION

1. Field of the Invention

This invention relates to a valve which can be opened to allow fluids to pass therethrough and more particularly, but not solely, to valve or so-called water key for a musical wind instrument, which can be opened to drain saliva from within the instrument.

2. Related Background Art

Musical brass wind instruments comprise elongate lengths of pipe work extending from the mouthpiece. These pipes are formed into various coils and bends, depending on the type of instrument.

When playing a brass instrument, it is common for saliva to pass from the musicians's mouth into the pipe work, where it collects at the lowermost point of one of the bends or coils. The collection of saliva affects the performance of the musical instrument and is undesirable.

In order to overcome this problem it is well known to provide a so-called water key on brass instruments, which can be opened to drain the saliva. Such water keys generally comprise an annular collar braised to the outside of the pipe work around an aperture, formed on the underside of a point on a bend or coil of the pipe work, which is lowermost when the instrument is being played.

A disc having a pad of resiliently compressible material, such as cork, on its underside is mounted over the collar on an elongate arm which extends longitudinally of the pipe. The arm is pivoted intermediate its opposite ends to a support member which is also braised to the pipe work.

The opposite end of the arm is enlarged to provide a surface which can be depressed to lift the disc away from the apertured collar and thereby allow the collected saliva to pass therethrough. A spring biases the arm into a position where the disc is normally held against the collar.

The shape of the arm and disc assembly is such that it generally has to be formed of a metal casting. However, this is costly to produce.

The resilient pad on the disc is prone to wear and over time, the pad provides an imperfect seal and allows air to escape from the pipe whilst the instrument is in use. It will be appreciated that this affects the performance of the instrument.

Another disadvantage is that the spring often breaks or becomes disengaged, thereby allowing the disc to move away from the apertured collar and again allowing air to escape.

Yet another disadvantage is that the support has to be attached to the pipe work and thus is difficult and time consuming to achieve.

Thus, known water keys are complicated and expensive in construction and work unreliably.

SUMMARY OF THE INVENTION

We have now devised a valve which alleviates the above mentioned problems.

In accordance with this invention there is provided a valve comprising an inlet aperture, a valve member having a convex surface seated in the inlet aperture to normally close the latter, bias means for biasing the valve member into the aforesaid position and means for displacing the valve member in a direction which extends in the direction of the plane of the inlet aperture, into an open position away from the aperture.

The valve is simple and inexpensive in construction but yet provides a reliable closure which can easily be opened by displacing the valve member out of the inlet aperture of the valve.

Preferably the inlet aperture is circular, the valve member comprising a ball, preferably formed of a metal, which seats in said circular inlet aperture.

Preferably the valve member is normally seated on a concave surface surrounding the inlet aperture.

Preferably the valve member is mounted in a housing having said inlet aperture at one end thereof.

Preferably the distance through which the ball has to move between the open and closed positions is less than the radius of the ball, so that the ball remains partially across the aperture when in said open position and thereby returns to the closed position under said bias when the displacing means is released.

Preferably said displacing means comprises a projection which extends through a side wall of the housing.

Preferably said displacing means comprises a plurality of projections extending radially inwardly through the housing towards the valve member, said projections being circumferentially spaced apart.

Preferably the projections are connected at their respective outer ends to an actuator which surrounds the housing.

Preferably the actuator is annular.

Preferably there are at least three projections spaced equally apart.

Preferably an outlet is formed in the opposite end wall of the housing to said inlet aperture.

Preferably the valve member is biased into the aperture by a spring extending between the outlet end of the housing and the valve member.

Also in accordance with this invention there is provided a musical wind instrument comprising a wind pipe and a valve as hereinbefore described attached to the external surface of the wind pipe, the inlet of the valve being sealingly connected to an aperture in the wall of the pipe,

BRIEF DESCRIPTION OF THE DRAWINGS

An embodiment of this invention will now be described by way of example only and with reference to the accompanying drawings, in which.

DETAILED DESCRIPTION OF THE PREFERRED EMBODIMENT

Figure 1:
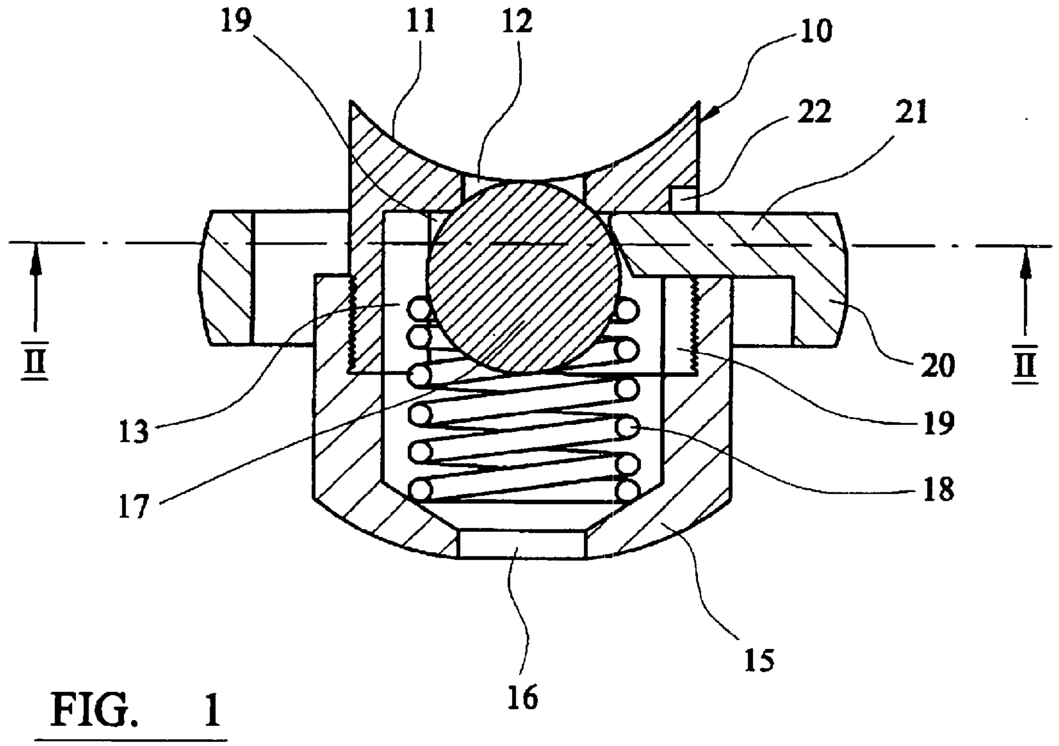
FIG. 1 is a longitudinal-sectional view of a water key, in accordance with this invention, for a brass wind instrument.
Figure 2:
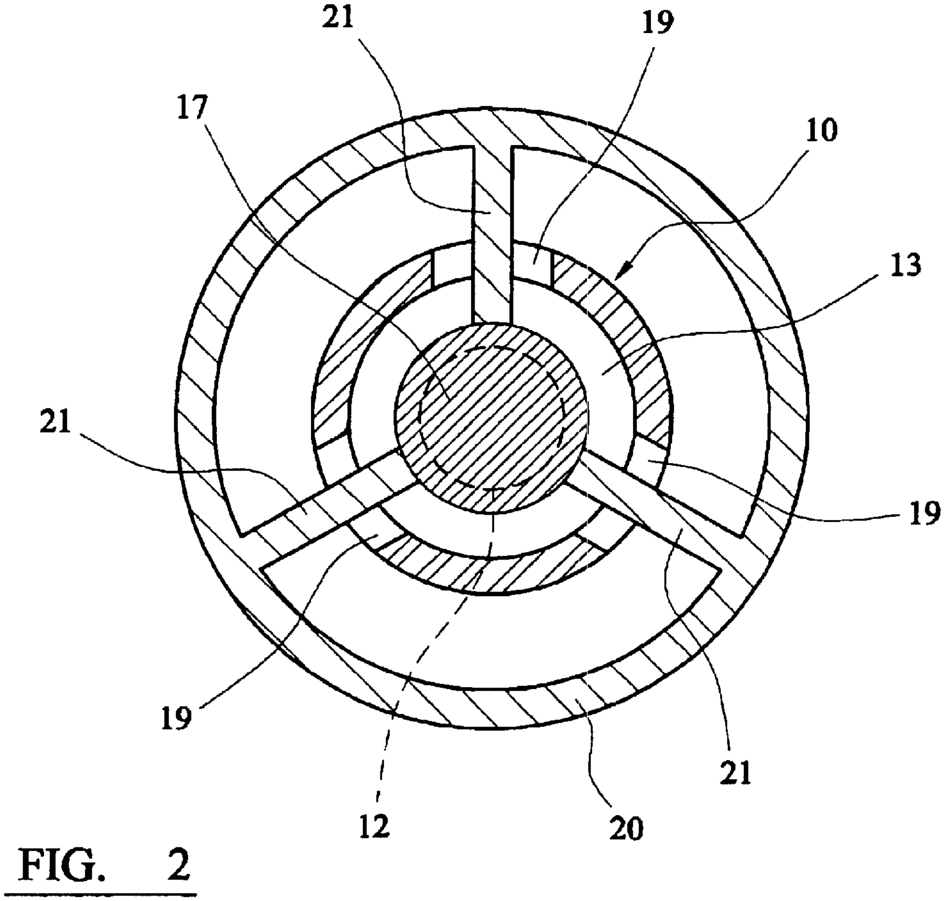
FIG. 2 is a cross-sectional view along the line II—II of the water key of FIG. 1.

Referring to the drawings, there is shown a water key for a musical brass wind instrument, comprising a tubular base portion 10 having a concave channel 11 extending across its upper end, transverse the longitudinal axis thereof. The external wall of the base portion 10 is externally screw-threaded over a region extending from its lower end towards a point disposed intermediate opposite ends of the base portion.

The base portion 10 comprises a longitudinally-extending through passage extending between its upper and lower ends. The upper end of the passage provides an inlet 12 to the valve and has a reduced diameter extending co-axially with the lower portion of the passage which forms a valve chamber 13. The inlet 12 has a diameter which is slightly more than half that of the chamber 13.

A tubular cap-ended cover 15 comprises an internally screw-threaded portion at its upper end for engaging the externally screw-threaded base 10. The internal diameter of the internally screw-threaded portion of the upper end of the cover 15 is greater than the internal diameter of the lower portion of the cover, so that it is only possible to engage the cover 15 partially onto the base 10. An aperture 16 is formed in the end wall of the cover 15.

A metal ball 17 having a diameter greater than the inlet 12 is mounted inside the chamber 13 in the base 10. The ball 17 is biased upwardly to close the inlet 12 by a helical coil spring 18, extending from the inner surface of the end wall of the cover 15. The point at which the inlet 12 opens into the chamber 13 is preferably chamfered to provide an annular surface having a complimentary profile, against which the ball 17 can sealingly seat.

The lower end of the wall of the base portion 10 comprises three longitudinally-extending through slots 19, which are spaced apart by equal circumferential distances. The slots 19 extend from the lower end of the base 10 and terminate at the point where the inlet 12 opens into the chamber 13.

An annular actuator 20, mounted concentrically around the base 10, carries three projections 21 which extend radially inwardly into the base 10 through respective slots 19 formed therein. The inner ends of the projections 21 loosely engage the ball 17, when the latter is seated across the inlet 12, at respective points on the same hemispherical side of the ball 17 as that which is seated across the inlet 12. The outer ends of the projections 21 preferably taper radially inwardly towards the inlet 12.

When the cover 15 is fitted to the base 10, it captively constrains the actuator 20 against axial movement with respect to the base 10 but allows radial movement in any direction, since the slots 19 are substantially wider than the projections 21. The upper surface of the projections 21 may be biased upwardly by the cover 15 against a spring 22 disposed around the base 10: this helps to resiliently hold the actuator 20 in place and thereby prevents it from rattling.

The concave transverse channel 11 on the upper surface of the base 10 is braised or otherwise sealingly attached to the external surface of the pipe work of the musical instrument around an aperture, formed on the underside of a point on a bend or coil of the pipe work, which is lowermost when the instrument is being played and which is therefore a point at which saliva will tend to collect.

In order to drain the saliva, the musician merely has to push the actuator 20 in any radial direction: this causes the ball 17 to roll radially of the chamber 13 in the base 10, allowing the saliva to flow through the inlet 12 past the ball 17 and spring 18, and through the aperture 16.

When the actuator 20 is released, the ball 17 is biased back across the inlet 12 by the spring 18, into a position where it securely closes the inlet 12.

A water key in accordance with this invention is simple and inexpensive in construction, yet provides a reliable and effective means by which saliva can be drained from musical instruments.

We claim:

1. A valve, comprising:

a ball-shaped valve member seated in an inlet aperture for said valve for closing the inlet aperture;

means for biasing said ball-shaped valve member into the inlet aperture; and, means for displacing said ball-shaped valve member, in a direction extending in a direction of a plane of the inlet aperture, into an open position away from the inlet aperture, said means for displacing comprising:

a housing;

an actuator surrounding said housing; and, a plurality of circumferentially-spaced projections extending radially inwardly through said housing towards said ball-shaped valve member and connected at their respective outer ends to said actuator.

2. The valve according to claim 1, wherein said ball-shaped valve member moves a distance between an open position and a closed position that is less than a radius of said ball-shaped valve member, so that said ball-shaped valve member remains partially across the inlet aperture when in said open position and is biased for returning to said closed position via said means for biasing when said means for displacing is released.

3. The valve according to claim 1, wherein said ball-shaped valve member is seated on a concave surface surrounding the inlet aperture.

4. The valve according to claim 1, wherein said actuator is of said means for displacing said ball-shaped valve member is annular.

5. The valve according to claim 1, wherein said plurality of circumferentially-spaced projections of means for displacing said ball-shaped valve member includes at least three circumferentially-spaced projections angularly-spaced equally apart.

6. The valve according to claim 1, wherein said valve includes an outlet aperture formed in an opposite end wall thereof to that through which the inlet aperture is formed.

7. The valve according to claim 6, wherein said ball-shaped valve member is biased into the inlet aperture via a spring extending between the outlet aperture and said ball-shaped valve member.

8. A musical wind instrument, comprising:

a wind pipe having an external surface; and, a valve attached to said external surface of said wind pipe, said valve including:

a ball-shaped valve member seated in an inlet aperture for said valve for closing the inlet aperture;

means for biasing said ball-shaped valve member into the inlet aperture; and, means for displacing said ball-shaped valve member, in a direction extending in a direction of a plane of the inlet aperture, into an open position away from the inlet aperture, said means for displacing comprising:

a housing;

an actuator surrounding said housing; and, a plurality of circumferentially-spaced projections extending radially inwardly through said housing towards said ball-shaped valve member and connected at their respective outer ends to said actuator, the inlet aperture of said valve being sealingly connected to an aperture in said external surface of said wind pipe.

9. The musical wind instrument according to claim 8, wherein said ball-shaped valve member moves a distance between an open position and a closed position that is less than a radius of said ball-shaped valve member, so that said ball-shaped valve member remains partially across the inlet aperture when in said open position and is biased for returning to said closed position via said means for biasing when said means for displacing is released.

10. The musical wind instrument according to claim 8, wherein said ball-shaped valve member is seated on a concave surface surrounding the inlet aperture.

11. The musical wind instrument according to claim 8, wherein said actuator is of said means for displacing said ball-shaped valve member is annular.

12. The musical wind instrument according to claim 8, wherein said plurality of circumferentially-spaced projections of means for displacing said ball-shaped valve member includes at least three circumferentially-spaced projections angularly-spaced equally apart.

13. The musical wind instrument according to claim 8, wherein said valve includes an outlet aperture formed in an opposite end wall thereof to that through which the inlet aperture is formed.

14. The musical wind instrument according to claim 13, wherein said ball-shaped valve member is biased into the inlet aperture via a spring extending between the outlet aperture and said ball-shaped valve member.

* * * * *